(12) United States Patent
Etcheverry Cabrera et al.

(10) Patent No.: US 12,155,419 B2
(45) Date of Patent: Nov. 26, 2024

(54) GENERATION OF OPTICAL PULSES WITH CONTROLLED DISTRIBUTIONS OF QUADRATURE VALUES

(71) Applicants: FUNDACIÓ INSTITUT DE CIÈNCIES FOTÒNIQUES, Barcelona (ES); INSTITUCIÓ CATALANA DE RECERCA I ESTUDIS AVANÇ ATS, Barcelona (ES)

(72) Inventors: Sebastian Etcheverry Cabrera, Barcelona (ES); Venkata Ramana Raju Valivarthi, Barcelona (ES); Valerio Pruneri, Barcelona (ES)

(73) Assignees: FUNDACIÓ INSTITUT DE CIÈNCIES FOTÒNIQUES, Barcelona (ES); INSTITUCIÓ CATALANA DE RECERCA I ESTUDIS AVANÇ ATS, Barcelona (ES)

( * ) Notice: Subject to any disclaimer, the term of this patent is extended or adjusted under 35 U.S.C. 154(b) by 149 days.

(21) Appl. No.: 17/310,854

(22) PCT Filed: Feb. 27, 2020

(86) PCT No.: PCT/EP2020/055107
§ 371 (c)(1),
(2) Date: Aug. 26, 2021

(87) PCT Pub. No.: WO2020/174034
PCT Pub. Date: Sep. 3, 2020

(65) Prior Publication Data
US 2022/0085895 A1  Mar. 17, 2022

(30) Foreign Application Priority Data
Feb. 27, 2019 (EP) ..................... 19382139

(51) Int. Cl.
*H04B 10/50* (2013.01)
*H01S 5/042* (2006.01)
(Continued)

(52) U.S. Cl.
CPC .......... *H04B 10/70* (2013.01); *H01S 5/0428* (2013.01); *G06F 7/58* (2013.01); *H04B 10/50* (2013.01);
(Continued)

(58) Field of Classification Search
CPC ...... H04B 10/70; H04B 10/516; H04B 10/60; H04B 10/508; H04B 10/50; H04B 10/503;
(Continued)

(56) References Cited

U.S. PATENT DOCUMENTS 10,153,848 B2 * 12/2018 Lucamarini ........... H04L 9/0852
11,709,657 B2 * 7/2023 Paraiso ............... H01S 5/06216
356/450
(Continued)

FOREIGN PATENT DOCUMENTS

CN 109039610 A 12/2018

OTHER PUBLICATIONS

Wang et al, 25MHz clock continuous variable quantum key distribution system over 50km fiber channel, Feb. 2015, Scientific Reports, All Document. (Year: 2015).*
(Continued)

*Primary Examiner* — Dibson J Sanchez
(74) *Attorney, Agent, or Firm* — McCoy Russell LLP

(57) ABSTRACT

The present disclosure relates to an apparatus for generating light pulses, comprising a laser device configured to output the light pulses and a pulse driver configured to supply electrical pulses to the laser device to drive the laser device. Furthermore, the pulse driver is configured to supply the
(Continued)

electrical pulses with amplitudes/intensities obeying a predetermined probability distribution to the laser device such that quadrature values of the light pulses obey another pre-determined probability distribution.

16 Claims, 3 Drawing Sheets

(51) Int. Cl.
*H04B 10/70* (2013.01)
*G06F 7/58* (2006.01)
*H04B 10/508* (2013.01)
*H04L 9/08* (2006.01)

(52) U.S. Cl.
CPC .......... *H04B 10/503* (2013.01); *H04B 10/504* (2013.01); *H04B 10/508* (2013.01); *H04L 9/0852* (2013.01)

(58) Field of Classification Search
CPC ... H04B 10/504; H01S 5/0428; H04L 9/0852; G06F 7/58
USPC .................................. 398/118–131, 182–201
See application file for complete search history.

(56) References Cited

U.S. PATENT DOCUMENTS

| | | | | |
|---|---|---|---|---|
| 2011/0176144 A1* | 7/2011 | Chen | ................... | H04B 10/677 |
| | | | | 356/521 |
| 2013/0036145 A1* | 2/2013 | Pruneri | ................... | G06F 7/588 |
| | | | | 708/250 |
| 2015/0226609 A1* | 8/2015 | Cho | ..................... | G01J 3/4535 |
| | | | | 356/477 |
| 2015/0331672 A1* | 11/2015 | Yuan | ..................... | H04L 9/0852 |
| | | | | 359/107 |
| 2017/0115960 A1* | 4/2017 | Pruneri | ................. | H01S 3/1106 |
| 2017/0237505 A1 | 8/2017 | Lucamarini et al. | | |
| 2019/0199523 A1* | 6/2019 | Alleaume | ............. | H04L 9/0852 |
| 2019/0393675 A1* | 12/2019 | Marangon | ................ | G01J 11/00 |
| 2020/0204362 A1* | 6/2020 | Li | ......................... | H04L 9/0852 |

OTHER PUBLICATIONS

Huang et al, Long-distance continuous-variable quantum key distribution by controlling excess noise, Jan. 2016, Scientific Reports, All Document. (Year: 2016).*
Guo et al, CN 109039610 A, Dec. 2018, CNIPA, All Document. (Year: 2018).*
Abellan et al, Ultra-fast quantum randomness generation by accelerated phase diffusion in a pulsed laser diode, Jan. 2014, Optics Express, All Document. (Year: 2014).*
Rude et al, Interferometric photodetection in silicon photonics for phase diffusion quantum entropy sources, Nov. 2018, Optics Express, All Document. (Year: 2018).*
Jofre, M. et al., "True random Nos. from amplified quantum vacuum," arXiv Cornell University Website, Available Online at https://arxiv.org/abs/1110.0599, Available Online Oct. 4, 2011, Revised Oct. 17, 2011, 11 pages.
Abellán, C. et al., "Ultrafast Quantum Random Number Generation Using Off-the-shelf Components," Proceedings of the 2014 Conference on Lasers and Electro-Optics (CLEO)—Laser Science to Photonic Applications, Jun. 8, 2014, San Jose, California, 2 pages.
Guo, Y. et al., "Phase Estimation and Compensation for Continuous-Variable Quantum Key Distribution," International Journal of Theoretical Physics, vol. 58, No. 5, May 2019, Available Online Feb. 19, 2019, 13 pages.
ISA European Patent Office, International Search Report Issued in Application No. PCT/EP2020/055107, Jun. 26, 2020, WIPO, 3 pages.

* cited by examiner

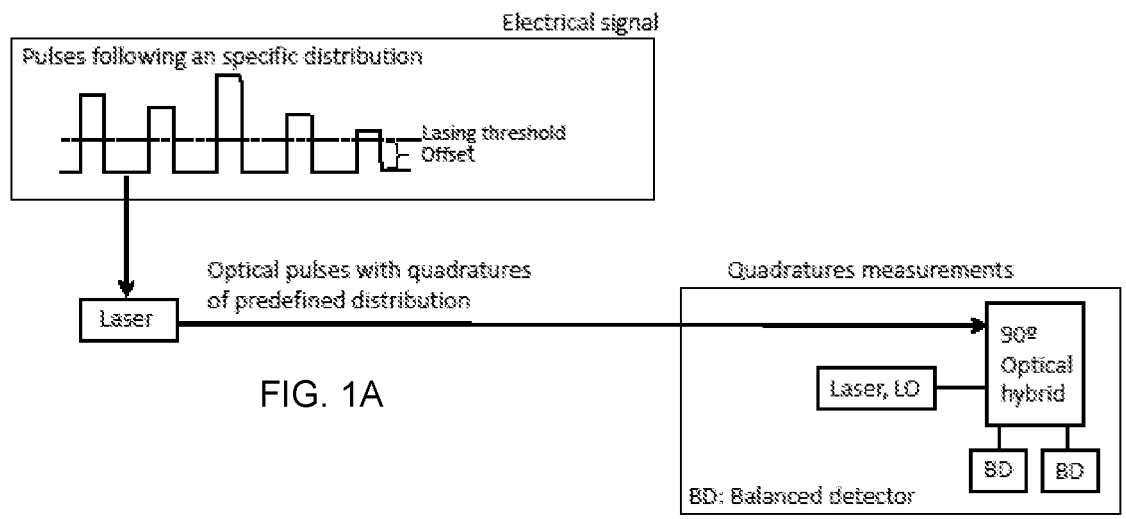
FIG. 1A
FIG. 1B
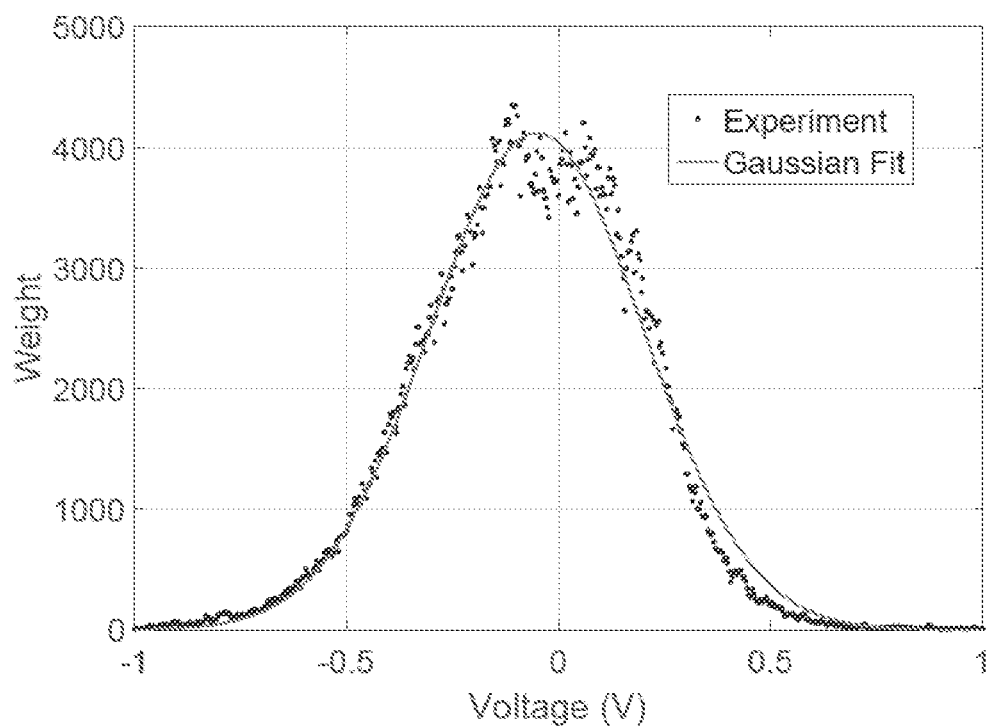
FIG. 2

GENERATION OF OPTICAL PULSES WITH CONTROLLED DISTRIBUTIONS OF QUADRATURE VALUES

CROSS REFERENCE TO RELATED APPLICATIONS

The present application is a U.S. National Phase of International Application No. PCT/EP2020/055107 entitled "GENERATION OF OPTICAL PULSES WITH CONTROLLED DISTRIBUTIONS OF QUADRATURE VALUES," and filed on Feb. 27, 2020. International Application No. PCT/EP2020/055107 claims priority to European Patent Application No. 19382139.4 filed on Feb. 27, 2019. The entire contents of each of the above-listed applications are hereby incorporated by reference for all purposes.

TECHNICAL FIELD

The present disclosure relates to an apparatus and method for generating optical (laser) pulses that show quadrature values with some pre-determined probability distribution.

BACKGROUND AND SUMMARY

Communication and cryptography based on electromagnetic pulses, for example, in form of optical laser pulses, is of growing interest. There is a need for developing compact and high-performance optical transmitters for classical and quantum optical communication, as well as for generating quantum random numbers with pre-determined distributions.

Many transmitters for optical communications employ lasers and external electro-optic modulators (such as phase or intensity modulators) to encode information onto pulses of laser light. For instance, coherent optical communication employs electro-optic modulators to encode information in the electromagnetic field quadratures, which are measured at the receiver side by using coherent detection.

The quadrature, denoted as p and q, correspond to the two perpendicular components of the amplitude vector in the optical phase space (i.e., $p=A\cos(\varphi)$ and $q=A\sin(\varphi)$, where A and $\varphi$ are the amplitude and phase of the light pulses, respectively). In telecommunications, the two quadratures are also referred to as the in-phase and the quadrature components, respectively, of the electromagnetic field.

Electro-optic modulators are typically based on materials whose refractive index or absorption varies with the applied electric field. For example, modulators based on $LiNbO_3$ or semiconductor waveguides are widely used in transmitters to induce both amplitude (intensity) and phase modulations. However, they suffer from some limitations such as: (1) high driving electrical power consumption, (2) bulky devices that limit the compactness of the transmitters, (3) instability over time due to fluctuations of operating points and (4) limited electro-optic bandwidths. Therefore, it is desirable to build transmitters, which circumvent the need of electro-optic modulators, leading to units with a higher performance, lower cost, compactness, and robustness.

Besides classical communication, several schemes in quantum communications also rely on external electro-optic modulation. Moreover, in quantum communication, the above-mentioned limitations are more critical due to the low signal-to-noise of systems, which are typical when propagating weak light over long distances. In such cases, the instability and fluctuations of modulators can result in a very low performance.

Among all the quantum communication technologies, quantum key distribution (QKD) is one of the most mature. QKD allows two parties to exchange a secret key, where the security of the key is guaranteed by relying on principles of quantum physics. In standard QKD, a transmitter (Alice) sends quantum signals to a receiver (Bob). QKD protocols can be divided into two groups, discrete variable QKD (DV-QKD) and continuous variable (CV-QKD) protocols. In DV-QKD, the key is encoded by assigning discrete values to a degree of freedom of single photons. For example, the BB84 DV-QKD protocol uses four polarization states to encode the key, In CV-QKD, the quantum signal corresponds to weak attenuated pulses (weak coherent states) with the key information encoded by assigning continuous values to the quadratures of the electromagnetic field. For instance, the GG02 CV-QKD protocol uses coherent states of light with quadratures modulated according to random Gaussian distribution.

DV-QKD requires expensive single photon technology and dedicated fiber channels, which has greatly limited its application in real-word scenarios. CV-QKD removes the need of single photon technology by using coherent detection which employs intense reference pulses, called local oscillator (LO), to measure the quadratures of light pulses. One advantage of CV-QKD with respect to DV-QKD is that it is less subjected to security degradation when the quantum channel is co-propagating with a higher power classical channel. The implementation of CV-QKD can be carried out using standard components developed for coherent optical communications, sharing hardware and channels with classical communication. To date, all the CV-QKD implementation use cumbersome external electro-optic modulator schemes to modulate the phase and amplitude of light pulses. There is thus a need of improving CV-QKD transceivers, increasing robustness, simplifying schemes, reducing cost, and achieving higher bit-rate.

In view of the above, it is an object of the present disclosure to provide an apparatus and method for generating optical pulses in the context of communication and cryptography wherein the above-mentioned problems are alleviated.

The present disclosure addresses the above-mentioned object by providing an apparatus for generating light pulses, comprising a laser device configured to output the light pulses (optical pulses, both terms are used interchangeable herein) and a pulse driver configured to supply electrical pulses to the laser device to drive the laser device. Furthermore, the (electrical) pulse driver is configured to supply the electrical pulses with amplitudes/intensities obeying a pre-determined probability distribution (in time, namely, within one temporal repetition period/duty cycle of electrical pulses) to the laser device such that quadrature values of the light pulses obey another pre-determined probability distribution.

According to an embodiment the apparatus comprises a control means configured to repeatedly operate the laser device a) below the laser threshold for a first pre-determined time period and b) subsequently above the laser threshold for a second pre-determined time period such that the phases of the light pulses are randomized (for example, may obey a uniform distribution). The laser threshold is represented by some threshold pump power or threshold current and is given by some state where a small-signal gain just equals the resonator losses.

Moreover, the above-mentioned object is addressed by providing a method of generating first light pulses showing a pre-determined probability distribution of quadrature values, comprising the steps of generating first electrical pulses with amplitudes/intensities obeying a probability distribution (for example, a Rayleigh distribution) and driving a first laser device by means of the generated first electrical pulses. In this method, driving the first laser device comprises repeatedly driving the first laser device a) below the laser threshold of the first laser device for a first pre-determined time period and b) subsequently above the laser threshold for a second pre-determined time period such that the phases of the first light pulses output by the first laser device based on the first electrical pulses are randomized in a continuous train of light pulses (for instance, the phases can obey a uniform distribution).

The quadratures depend on the amplitudes (intensities) and phases of the light pulses. The distribution of the quadratures is, according to the present disclosure, controlled by the provision of the pre-determined distribution of the electrical pulses provided by an electrical pulse driver/generator. By repeatedly driving/operating the laser device below and above the laser threshold a continuous light pulse train with approximately uniformly distributed optical phases, i.e., with completely randomized phases of uniform distribution over the entire range from 0 to $2\pi$ radians, can be achieved.

The pulse driver may be configured to supply electrical pulses to the laser device that obey a Rayleigh distribution such that the amplitudes (intensities) of the light pulses also obey a Rayleigh distribution. In combination with the phases of the light pulses obeying a uniform distribution Gaussian distributed values of the quadratures of the light pulses result (each of $p=A\cos(\varphi)$ and $q=A\sin(\varphi)$, where A and $\varphi$ are the amplitude and phase of the light pulses) obey the Gaussian distribution Advantageously, by the thus provided embodiments of an apparatus and a method high-performance optical transmitters for classical and quantum communication purposes as well for quantum cryptography applications can be realized. The apparatus can be part of a quantum random number generator and/or quantum key distribution/exchange system.

The apparatus may further comprise a beam splitter and an unbalanced Mach-Zehnder interferometer. In this embodiment, the pulse driver may be configured to generate and supply the electrical pulses not only with the pre-determined probability distribution but with probability distributed electrical pulses interleaved by electrical pulses that are showing constant/equal amplitudes. The unbalanced Mach-Zehnder interferometer is used to interfere adjacent electrical pulses (one of which shows the constant amplitude the other one showing an amplitude according to the probability distribution). Thereby, a reliable quantum random number generator with pre-determined distribution can be provided.

Moreover, it is provided a system comprising an apparatus according to one of the above-described embodiments and further comprising a detector device (receiver) configured to receive the light pulses output by the laser device and comprising a balanced detector means. By means of the detector device quadrature measurements and, thus, the detection of transmitted random number codes contained in the light pulses output by the laser device and reception of a quantum key can be performed, for example.

For example, the detector device of the system may further comprise another laser device (representing a local oscillator providing reference signals/light pulses used for measuring quadrature values) and/or a 90° optical hybrid for performing the quadrature measurements.

According to embodiments the system can operate as a quantum cryptography system, and in certain embodiments, a continuous variable quantum key distribution (CV-QKD) system. Here, the apparatus operates as Alice whereas the detector device operates as Bob. According to one of these embodiments the apparatus comprises a beam splitting for splitting the light pulses output by the laser device, another laser device functioning as a local oscillator outputting relatively strong pulses (relatively high amplitudes) witch constant amplitudes and another detector device for measuring quadrature values. Alternatively, no other laser device is provided in addition to the beam splitter and the other detector device but the local oscillator is transmitted from Alice to Bob by means of relatively strong pulses of equal amplitudes interleaved with pulses obeying the above-mentioned probability distribution, for example, a Rayleigh distribution. In both cases, the other detector device at the Alice side may be constructed similar to the above-described detector device.

According to one embodiment the apparatus of the system comprises another detector device. The detector device of this embodiment may comprise a balanced detector and a 90° optical hybrid for measuring quadrature values of light pulses provided by the laser device of the apparatus by means of reference pulses received from the Bob side. The laser light pulses output by the laser device of the apparatus that is driven by the pulse driver are split by a beam splitter. One of the outputs of the beam splitter is supplied to an attenuator and exits the apparatus, for example, via a circulator, to be received by the detector device of the system.

The other output of the beam splitter is fed to the other detector device provided on the apparatus (Alice) side. The detector device of the system (i.e. Bob) comprises a local oscillator in form of another laser device and also another beam splitter for splitting light emitted by the other laser device. One of the outputs of the other beam splitter is used by a balanced detector on the Bob side in order to determine quadratures on the Bob side while the output of the other beam splitter is supplied (via some LO channel) to the apparatus in order to be used for the determination of quadratures on the Alice side.

Furthermore, a method of generating random numbers is provided herein. This method comprises the steps of the above-describe method of generating light pulses showing a pre-determined probability distribution of quadrature values. The randomness is guaranteed by the uniform distribution of the phases of the light pulses output by the laser device. The random numbers could be obtained by optical interference and subsequent measurement with a proper detector device.

For instance, the light pulses generated with Rayleigh amplitude distribution and approximately uniform random phase can be interfered with a reference laser device (local oscillator) and detected with a balanced detector. In this case, the detected values will be truly random (due to phase diffusion) and follow a Gaussian distribution. In addition, a Gaussian distributed QRNG can be obtained by interleaving optical pulses with constant amplitudes and optical pulses with a Rayleigh distribution and using an unbalanced Mach-Zehnder interferometer to interfere adjacent pulses. QRNG with a specific distribution can be useful for CV-QKD, where there is a need of random number with continuous values following some specific probability distribution.

Accordingly, it is provided a method of generating random numbers, comprising the steps of the method of generating light pulses showing a pre-determined probability distribution of quadrature values as described above, and further comprising
generating second electrical pulses comprising the first electrical pulses obeying the probability distribution and interleaved by third electrical pulses that are showing equal amplitudes;
driving the first laser device by means of the generated second electrical pulses to output the first light pulses; and
interfering adjacent ones of the generated second electrical pulses by an interferometer, for example, an unbalanced Mach-Zehnder interferometer.

The thus disclosed method allows for simplifying or even avoiding electronic post-processing and thus enables obtaining higher rates of generated random numbers.

Furthermore, according to some embodiments, methods of distributing quantum keys for encryption of communication data are provided. According to an embodiment a method of distributing a quantum key is provided that comprises the steps of the method of generating light pulses showing a pre-determined probability distribution of quadrature values as described above and further comprises
at a transmitter (Alice) side: generating second electrical pulses with constant amplitudes; driving a second laser device (functioning as a local oscillator) by means of the generated second electrical pulses to output second light pulses (reference light pulses); beam splitting the first light pulses to obtain a first portion of the first light pulses and a second portion of the first light pulses; beam splitting the second light pulses to obtain a first portion of the second light pulses and a second portion of the second light pulses; measuring the quadrature values of the first portion of the first light pulses using the first portion of the second light pulses; multiplexing the second portion of the first light pulses and the second portion of the second light pulses to obtain multiplexed light pulses; attenuating the multiplexed light pulses to obtain attenuated multiplexed light pulses; and transmitting the attenuated multiplexed light pulses to a receiver (Bob) side (connected to the transmitter side by some communication channel);
and
B) at the receiver side: receiving the transmitted attenuated multiplexed light pulses and measuring the quadrature values of the received attenuated multiplexed light pulses, for example, by means of another beam splitter, a delay component a 90° optical hybrid and a balanced detector (see also detailed description below).

According to an embodiment a method of distributing a quantum key is provided that comprises the steps of the method of generating light pulses showing a pre-determined probability distribution of quadrature values as described above and further comprises
A) at a transmitter (Alice) side:
generating second electrical pulses comprising the first electrical pulses obeying the probability distribution and interleaved by third electrical pulses that are showing equal amplitudes;
driving the first laser device by means of the generated second electrical pulses to output the first light pulses;
beam splitting the first light pulses to obtain a first portion of the first light pulses and a second portion of the first light pulses;
measuring the quadrature values of the first portion of the first light pulses;
attenuating the second portion of the first light pulses to obtain attenuated light pulses; and
transmitting the attenuated light pulses to a receiver side (connected to the transmitter side by some communication channel);
and
B) at the receiver side:
measuring the quadrature values of the received attenuated light pulses, for example, by means of another beam splitter, a delay component a 90° optical hybrid and a balanced detector (see also detailed description below).

Only one single (first) laser device is used in this embodiment whereby the constructional complexity is reduced.

According to another embodiment a second laser device representing a local oscillator generated at the receiver side (i.e. true local oscillator) is employed. According to this embodiment it is provided a method of distributing a quantum key that comprises the steps of the method of generating light pulses showing a pre-determined probability distribution of quadrature values as described above and further comprises
A) at a transmitter (Alice) side:
beam splitting the first light pulses to obtain a first portion of the first light pulses and a second portion of the first light pulses;
attenuating the first portion of the first light pulses by an attenuator to obtain attenuated light pulses; and
transmitting the attenuated light pulses, such as via a first circulator, to a receiver side (connected to the transmitter side by some communication channel);
and
B) at the receiver side:
generating reference light pulses by a second laser device (functioning as a local oscillator);
beam splitting the reference light pulses to obtain a first portion of the reference light pulses and a second portion of the reference light pulses;
measuring quadrature values of the attenuated light pulses received via a second circulator, by means of the first portion of the reference light pulses; and
transmitting via a second circulator, the second portion of the reference light pulses to the transmitter side;
and
C) at the transmitter side:
receiving the second portion of the reference light pulses, via the first circulator; and
measuring quadrature values of the second portion of the first light pulses by means of the received second portion of the reference light pulses.

All above-described embodiments of the inventive apparatus can be used to implement at least some of the steps of all above-described embodiments of the inventive method.

BRIEF DESCRIPTION OF THE FIGURES

Additional features and advantages of the present disclosure will be described with reference to the drawings. In the description, reference is made to the accompanying figures that are meant to illustrate certain embodiments of the disclosure. It is understood that such embodiments do not represent the full scope of the disclosure.

FIG. 1A schematically illustrates an embodiment of an apparatus for generating optical pulse with a controlled distribution of quadrature values and FIG. 1B illustrates a device for the measurement of quadrature values.

FIG. 2 shows a Gaussian fit of measurements results for values of a quadrature obtained by an apparatus according to the present disclosure.

DETAILED DESCRIPTION

Figure 3:
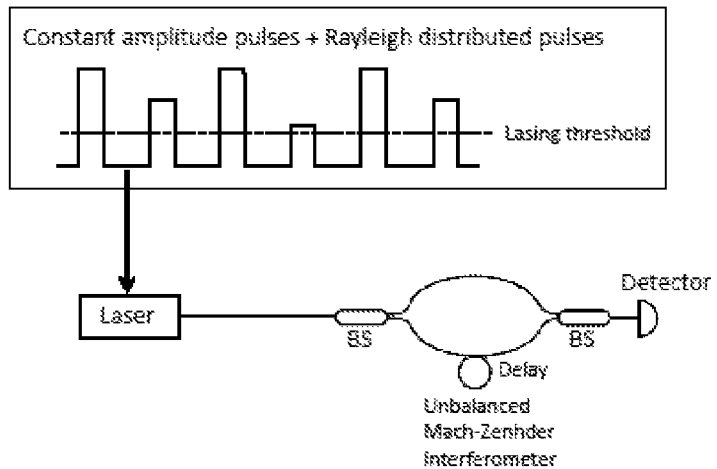
FIG. 3 schematically illustrates an embodiment of a system for generating and detecting random numbers comprising a laser device, an unbalanced Mach-Zehnder interferometer, and a photodetector.

The present disclosure provides an apparatus and a method for generating light/optical pulses with quadrature values obeying a probability distribution that can suitably be used in the context of communication and cryptography application, such as random number generation. Moreover, a system and a method for generating and detecting the light pulses are provided.

FIGS. 1A and 1B illustrate an embodiment of the present disclosure. Optical pulses are generated by a laser device. The laser device may comprise a laser diode (LD), providing single-mode operation and high modulation bandwidth. The laser device is supplied by electrical pulses of a desired duty cycle that drive the laser going below and above the laser threshold and obeying a pre-determined probability distribution. Repeated duty cycles each consisting of a first time period wherein the laser device is operated below the laser threshold and a second time period wherein the laser device is operated above the laser threshold are employed. The duration of the electrical pulses can be lower than 50% of the repetition period/cycle of the generated pulse train. The quadratures of the electromagnetic field are defined as $p=A\cos(\varphi)$ and $q=A\sin(\varphi)$, where $A$ and $\varphi$ are the amplitude and phase of the light pulses, respectively. Hence, the desired distributions for $p$ and $q$ can be obtained by a combination of a pre-determined amplitude distribution for $A$ and the distribution of $\varphi$. In some embodiments, generation of optical pulses with a pre-determined distribution of amplitudes and approximately uniformly distributed optical phases can be achieved.

The laser device is driven by electrical pulses provided by some pulse driver supplying the electrical pulses to the laser device. The laser device is modulated from below to above the laser threshold by means of the pulse driver. For example, the laser device is first operated with a current of at least some 30% below the threshold value, for example, in a range of 50% to 30% below the threshold value, producing simultaneously strong attenuation of the cavity field and a high amplified spontaneous emission (ASE). This attenuates any prior coherence to a negligible level, while the ASE, itself a product of vacuum fluctuations, provides a masking field with a true random phase. The laser is then briefly taken above the laser threshold, for example, up to 10%, 20% or 30% or even more above the laser threshold, in order to rapidly amplify the cavity field to a macroscopic level, for example, to a few tens of mW of peak power. The amplification is electrically pumped and thus optical phase-independent.

By modulating the laser from below to above the laser threshold, optical pulses with completely randomized phase are generated. According to a certain example, the laser device may comprise a laser diode emitting at around 852 nm and have a threshold value of 36 mA, for example. It may be electrically modulated at 100 MHz with electrical pulses of about 1 ns duration. Phase randomized coherent light/optical pulses of 400 ps time width and 3.5 mW peak power can be produced with theses specifications. It is noted that an optical isolator may be placed just after the laser device in order to avoid back reflections into the cavity of the laser diode of the same. The laser source can also operate at other wavelengths, for example of interest in optical communication fibre, e.g. at around 1300 or 1550 nm.

The electrical pulses provided by the pulse driver follow a pre-determined distribution as illustrated at the top of FIG. 1A. By properly choosing the temporal distribution of the electrical pulses for a given duty cycle the distribution of the amplitudes of the optical pulses and, thus, the distribution of the values of the quadratures can be controlled. It is noted, that an offset voltage can be added to the electrical signal to drive the laser from far below the threshold to near the threshold. This offset allows for the amplitude of optical pulses to follow the desired distribution and for the phases to properly randomize.

For example, using driving electrical pulses obeying a Rayleigh distribution can lead to quadrature values (both p and q) following a Gaussian probability distribution. The Gaussian distribution for the quadrature values results from the approximately uniform distributed phases and the Rayleigh distribution imposed to the amplitudes of the optical pulses by the electrical pulses in this case. FIG. 2 shows experimental results obtained by driving the laser device by Rayleigh distributed electrical pulses. The resulting distribution of values of a measured quadrature is proven to be close to Gaussian.

In some detail, this measurement was carried out by interfering the optical pulses with an external laser device, for example, a continuous wave (CW) laser, and measuring the outcome of the interference with a balanced detector BD. The balanced detector BD may comprise a photodiode for detecting the laser light pulses. The measurement was performed using 2 nanosecond pulses with a repetition rate of 100 MHz. Optical pulses with amplitudes following a Rayleigh distribution and phases following an approximately uniform distribution can lead to a distribution of quadratures is close to a Gaussian distribution. The variance of the Gaussian distribution can be controlled by adjusting the variance of the Rayleigh distribution. Here and in all the other embodiments described herein the generation of optical pulses with Gaussian distributed quadratures when using Rayleigh distributed electrical pulses is only used an example. Other probability distributions (for example, a mixed Rayleigh distribution) are also possible by varying the temporal distribution of the electrical pulses.

The phase of the emitted optical pulses is truly random due to the phase diffusion process and follows an approximate uniform distribution. The use of phase diffusion, together with the control of the electrical signal distribution, allows for the generation of quantum random number with pre-determined continuous distribution. For instance, the measurement of the quadratures by using an external laser enables the production of a quantum random number generator providing random numbers following a Gaussian distribution.

The optical pulses provided by the laser device can be transmitted via a communication (quantum) channel, for example, an optical fiber or a waveguide. The optical pulses can be received by a detector device as illustrated in FIG. 1B that can be used in gaining the experimental results shown in FIG. 2. The detector device comprises an external laser that acts as a local oscillator LO outputting reference light pulses, a 90° optical hybrid, and two balanced detectors BD. This scheme is called heterodyne detection, where both quadratures p and q are simultaneously measured for each pulse. Alternatively, homodyne detection can be implemented, where either p or q is measured for each pulse by shifting randomly the phase of the local oscillator with an external modulator.

An embodiment of a system comprising an apparatus for generating and detecting random numbers is illustrated in FIG. 3. A laser device is again driven by a pattern of electrical pulses wherein electrical pulses of constant amplitude are interleaved between Rayleigh distributed pulses, for example, as it is shown in the top row of FIG. 3 (pulses with constant amplitudes and pulse being part of the Rayleigh distribution alternate with each other).

Light pulses emitted by the laser device are supplied to a beam splitter. An unbalanced Mach-Zehnder interferometer can be used to interfere adjacent light pulses. The interferometer consists of an input coupler, which equally splits in power the incoming light pulses into the two arms of the interferometer. The long arm allows delaying the stream of copied pulses by one period with respect to the pulses in the short arm. The two streams of pulses interfere coherently in an output coupler of the interferometer. It is noted that besides providing a quantum random number generator the apparatus illustrated in FIG. 3 that has the capability of modulating a distribution of quadrature values by controlling the electrical pulses that drive the laser device could be used for applications in classical and quantum communication, in general (for instance, for building modulator-free and simple transceiver).

Figure 4:
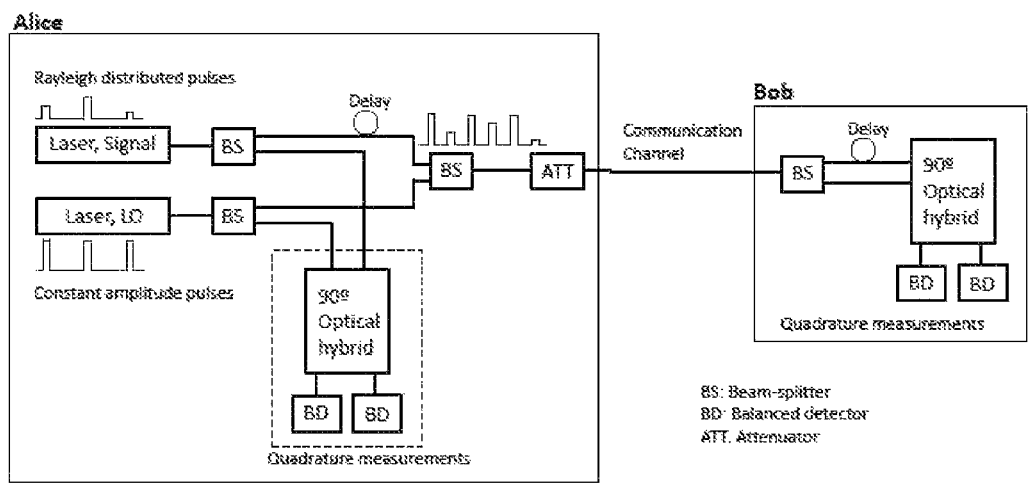
FIG. 4 illustrates an embodiment of a continuous variable quantum key distribution (CV-QKD) system with a "transmitted local oscillator" as it is provided herein.

FIG. 4 illustrates an embodiment of a continuous variable quantum key distribution (CV-QKD) system with a "transmitted local oscillator". On the Alice side, the system shown in FIG. 4 comprises a first laser device to output light pulses with quadrature values obeying a Gaussian distribution (signal pulses) and a second laser device functioning as a local oscillator LO to create strong light pulses with equal amplitudes (higher than the amplitudes of the light pulses output by the first laser device). Typically, the optical power of the local oscillator is several orders of magnitude higher than the signal pulses provided by the first laser. The local oscillator pulses and the signal pulses are split using two separate beam splitters BS, and Alice uses one of the outputs of each beam splitter BS to measure the quadratures at her station. This measurement can be done, for instance, by heterodyne detection using a 90° optical hybrid and balanced detectors of a detector device. The other outputs of the beam splitter BS are time-multiplexed using a delay component and a beam splitter BS. The optical pulses are attenuated at Alice's output with an optical attenuator ATT to obtain suitable quadrature variances required by the QKD protocol.

The attenuated pulses are sent through a quantum communication channel (fiber link or free space, for example) to Bob (another detector device at the receiver side), who also measures the quadratures values by means of balanced detectors BD and a 90° optical hybrid component (cf. also the apparatus illustrated in FIG. 1A). The measurements of Alice and Bob lead to correlated Gaussian data that can be used to obtain a secret key. Several other techniques can be used for multiplexing the output of the LO and the signal pulses before sending the signals through the communication channels, such as polarization, wavelength, or spatial multiplexing.

In the configuration shown in FIG. 4, the local oscillator output is transmitted from Alice to Bob ("transmitted local oscillator"). Alternately, Bob could use a third laser that is locally generated at his station to measure the quadratures. This scheme known as "truelocal oscillator" or "local local oscillator" provides advantages in term of security.

Figure 5:
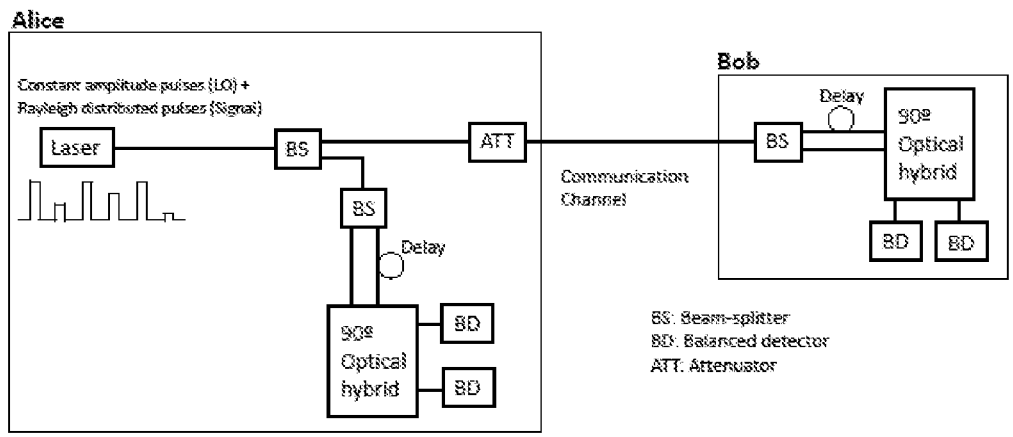
FIG. 5 illustrates another embodiment of a CV-QKD system.

FIG. 5 shows another realization of a CV-QKD scheme that could be used for two parties to obtain a secret key. This configuration requires only a single laser device and therefore simplifies the implementation as compared to the configuration illustrated in FIG. 4. A laser device is driven by electrical signals consisting of electrical pulses obeying Rayleigh distribution (signal) interleaved between strong pulses of equal amplitudes (local oscillator). The distribution of the quadratures of light pulses generated with the Rayleigh distributed electrical pulses (every second pulse) would be Gaussian. The optical pulses output by the laser device are split using a beam splitter. Alice estimates the values of the quadratures by measuring one of the outputs. The other output is attenuated to adjust the variance of the quadratures as required by the QKD protocol. After being attenuated the light pulses are sent to Bob, who measures the quadrature to obtain data which is correlated to Alice measurements.

Figure 6:
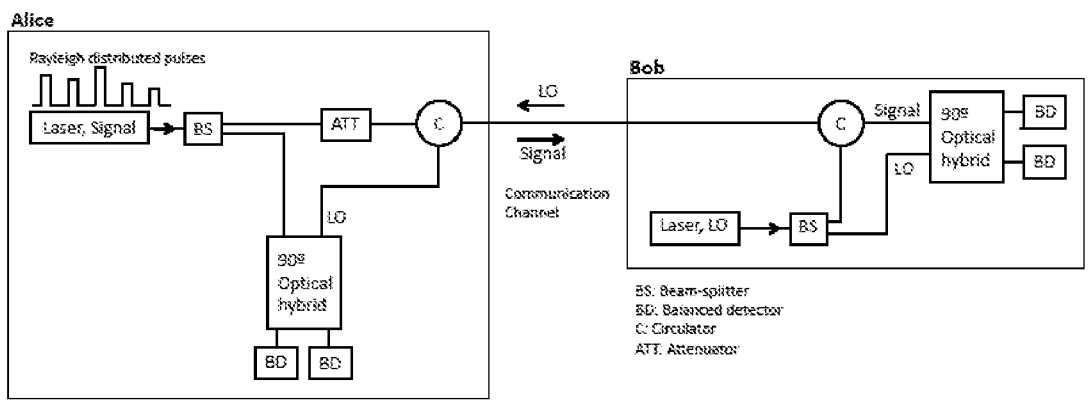
FIG. 6 illustrates an embodiment of a CV-QKD system with a "true local oscillator".

An embodiment of a system comprising a "true-local oscillator" that can be implemented with two laser devices as it is illustrated in FIG. 6. A laser device at the Alice side generates light pulses with Gaussian modulated quadratures by driving the laser from below to above the laser threshold with a Rayleigh distribution of electrical pulses. The light pulses generated by the laser device are then split using a beam splitter BS. One of the outputs is then attenuated to the required variance set by GG02 protocol and sent to Bob via port 1 of circulator C1. At the Bob side, the light pulses received via a quantum channel are input to port 2 of circulator C2. Bob uses another laser device (CW or pulsed) as an LO. The output of the LO is split using a beam splitter BS. One of the outputs of the beam splitter BS is used to measure the incoming quadratures from Alice at port 3 of C2. The other output of the beam splitter BS is fed into port 1 of C2 and reaches Alice through the communication channel Alice uses the incoming light pulses from Bob through port 3 of C1. Alice and Bob both can measure the quadrature by using, for instance, heterodyne detection by means of a 90° degree optical hybrid and balanced detectors BD.

All previously discussed embodiments are not intended as limitations but serve as examples illustrating features and advantages of the disclosure. It is to be understood that some or all of the above described features can also be combined in different ways.

The invention claimed is:

1. An apparatus for generating light pulses, comprising:
a laser device configured to output the light pulses; and
a pulse driver configured to supply electrical pulses to the laser device to drive the laser device;
wherein
the pulse driver is configured to supply the electrical pulses with a pre-determined probability distribution of amplitudes to the laser device such that quadrature values of the light pulses obey another pre-determined probability distribution, and
the laser device is configured to repeatedly operate a) below a laser threshold for a first pre-determined time period and b) subsequently above the laser threshold for a second pre-determined time period in such a manner that phases of the light pulses are randomized such that due to phase diffusion the phases of the light pulses obey a substantially uniform distribution.

2. The apparatus according to claim 1, wherein the pulse driver is configured to supply electrical pulses to the laser device that obey a Rayleigh distribution.

3. The apparatus according to claim 1, wherein the quadrature values of the light pulses obey a Gaussian distribution.

4. The apparatus according to claim 1, further comprising a beam splitter and an interferometer.

5. The apparatus in accordance with claim 4, wherein the interferometer is an unbalanced Mach-Zehnder interferometer.

6. System comprising an apparatus according to claim 1, and further comprising a detector device configured to receive the light pulses output by the laser device and wherein the detector device comprises a balanced detector means.

7. The system according to claim 6, wherein the detector device further comprises another laser device and/or a 90° optical hybrid.

8. The system according to claim 7, wherein
an attenuator configured for attenuating one output of the beam splitter of the apparatus is further included in the apparatus, and wherein the apparatus further comprises a first circulator configured for supplying the attenuated output to the detector device; and
the detector device comprises another beam splitter configured for receiving light pulses from another laser device and a second circulator configured for receiving an output of the other beam splitter and supplying it to the apparatus;
and wherein
the first circulator is configured for supplying the output of the other beam splitter supplied by the second circulator to the other detector device of the apparatus, and
the second circulator is configured for supplying the attenuated output of the beam splitter of the apparatus received via the first circulator to a balanced detector of the detector device of the system.

9. The method in accordance with claim 8, wherein the detector device of the system is received through a 90° optical hybrid.

10. The system according to claim 6, wherein the apparatus further comprises a beam splitter, an attenuator and either a) another detector device or b) both another laser device and another detector device.

11. A method of generating light pulses showing a pre-determined probability distribution of quadrature values, comprising:
generating first electrical pulses obeying a probability distribution; and
driving a first laser device by means of the generated first electrical pulses to output first light pulses;
wherein driving the first laser device comprises repeatedly driving a) the first laser device below a laser threshold of the first laser device for a first pre-determined time period and b) subsequently above the laser threshold for a second pre-determined time period such that phases of the output first light pulses are randomized such that due to phase diffusion the phases of the first light pulses obey a substantially uniform distribution.

12. The method according to claim 11, wherein the probability distribution is a Rayleigh distribution.

13. The method according to claim 11, wherein the method is for generating random numbers, and the method further comprises:
generating second electrical pulses comprising the first electrical pulses obeying the probability distribution and interleaved by third electrical pulses that are showing equal amplitudes;
driving the first laser device by means of the generated second electrical pulses to output the first light pulses; and
interfering adjacent ones of the generated second electrical pulses by an interferometer.

14. The method according to claim 11, wherein the method is for distributing quantum keys, and the method further comprises:
A) at a transmitter side:
generating second electrical pulses with constant amplitudes;
driving a second laser device by means of the generated second electrical pulses to output second light pulses;
beam splitting the first light pulses to obtain a first portion of the first light pulses and a second portion of the first light pulses;
beam splitting the second light pulses to obtain a first portion of the second light pulses and a second portion of the second light pulses;
measuring the quadrature values of the first portion of the first light pulses using the first portion of the second light pulses;
multiplexing the second portion of the first light pulses and the second portion of the second light pulses to obtain multiplexed light pulses;
attenuating the multiplexed light pulses by an attenuator to obtain attenuated multiplexed light pulses; and
transmitting the attenuated multiplexed light pulses to a receiver side; and
B) at the receiver side:
receiving the transmitted attenuated multiplexed light pulses; and
measuring the quadrature values of the received attenuated multiplexed light pulses.

15. The method according to claim 11, wherein the method is for distributing quantum keys, and the method further comprises:
A) at a transmitter side:
generating second electrical pulses comprising the first electrical pulses obeying the probability distribution and interleaved by third electrical pulses that are showing equal amplitudes;
driving the first laser device by means of the generated second electrical pulses to output the first light pulses;
beam splitting the first light pulses to obtain a first portion of the first light pulses and a second portion of the first light pulses;
measuring the quadrature values of the first portion of the first light pulses;
attenuating the second portion of the first light pulses by an attenuator to obtain attenuated light pulses; and
transmitting the attenuated light pulses to a receiver side; and
B) at the receiver side:
measuring the quadrature values of the received attenuated light pulses.

16. The method according to claim 11, wherein the method is for distributing quantum keys, and the method further comprises:
  A) at a transmitter side:
    beam splitting the first light pulses to obtain a first portion of the first light pulses and a second portion of the first light pulses;
    attenuating the first portion of the first light pulses by an attenuator to obtain attenuated light pulses; and
    transmitting the attenuated light pulses via a first circulator, to a receiver side; and
  B) at the receiver side:
    generating reference light pulses by a second laser device;
    beam splitting the reference light pulses to obtain a first portion of the reference light pulses and a second portion of the reference light pulses;
    measuring quadrature values of the attenuated light pulses received via a second circulator, by means of the first portion of the reference light pulses; and
    transmitting via a second circulator, the second portion of the reference light pulses to the transmitter side; and
  C) at the transmitter side:
    receiving the second portion of the reference light pulses via the first circulator; and
    measuring quadrature values of the second portion of the first light pulses by means of the received second portion of the reference light pulses.

* * * * *